Patented Feb. 16, 1926.

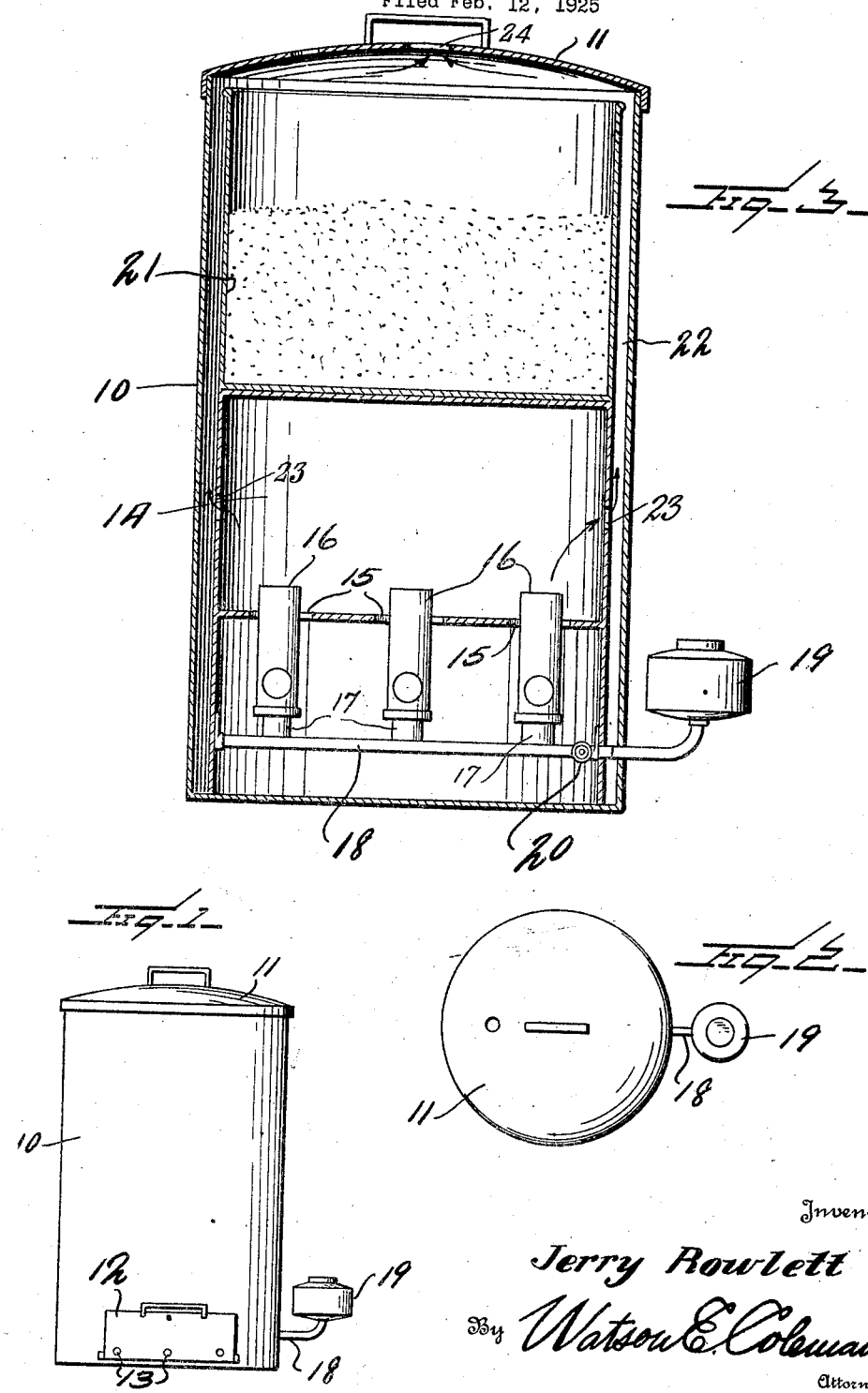

1,573,090

UNITED STATES PATENT OFFICE.

JERRY ROWLETT, OF MOUND CITY, MISSOURI.

FEED COOKER AND HEATER.

Application filed February 12, 1925. Serial No. 8,856.

*To all whom it may concern:*

Be it known that I, JERRY ROWLETT, a citizen of the United States, residing at Mound City, in the county of Holt and State of Missouri, have invented certain new and useful Improvements in Feed Cookers and Heaters, of which the following is a specification, reference being had to the accompanying drawings.

This invention relates to cookers and heaters, and particularly to a cooker designed for the purpose of cooking or heating stock feed or heating water for stock, though it may be used for a large variety of other purposes.

One of the objects of the invention is to provide a very simple, cheaply constructed and portable device which may be readily carried from one place to another on a farm and which may be used for the purpose of heating or cooking stock feed, chicken feed or the like or used for the purpose of heating water.

A further object is to provide a device of this character which includes an outer casing wherein there is disposed an oven, as it may be termed, or heating chamber heated by a plurality of kerosene lamps disposed in the bottom of the container, and wherein there is disposed a removable feed container normally resting upon the oven and heated by the heat therein.

A still further object is to provide a device of this character which is very simple, which may be readily separated into its component parts for the purpose of cleaning, and which has been found thoroughly effective in practice.

My invention is illustrated in the accompanying drawing, wherein:—

Figure 1 is an elevation of a heater constructed in accordance with my invention.

Figure 2 is a top plan view thereof;

Figure 3 is a vertical sectional view thereof.

Referring to this drawing, 10 designates an outer container or casing, which may be of galvanized metal or any other suitable material but which is preferably of metal, this casing being closed at the bottom and open at the top and being normally closed by a lid or cover 11. The bottom of the casing is formed with a door 12 having a plurality of draft openings 13 by which air may be admitted to the interior of the casing and to the lamps. Disposed within this container is an oven 14, the bottom of this oven being provided with three apertures 15.

Supported in the lower portion of the casing 10 are a plurality of chimneys 16 which extend up through these apertures and discharge into the oven. Disposed within the lower portion of the container are a plurality of lamps 17, these lamps being preferably fed by a supply pipe 18 which extends up through an aperture in the side wall of the casing and then upward and is connected to a detachable fuel tank 19. A valve 20 is provided which controls the passage of oil through the feed pipe 18 to the lamps.

Resting upon the oven 14 and filling the upper portion of the casing 10 is a feed container 21. This, like the oven, has a diameter smaller than the outer casing so that an insulating space 22 is left between this feed container and the outer casing.

The chamber 14 is provided with openings 23 in its side walls through which the products of combustion from the chimneys 16 may pass into the space 22 and upward through this space and out through an opening 24 in the cover of the cooker.

When it is desired to use this device, the lamps are lighted and hot air is discharged upward into the oven and the air in the oven thoroughly heated. The feed or other material to be cooked or heated is placed within the container 21 and the heat thoroughly cooks or warms up this feed. This device may be used to cook feed for hogs, cattle, or poultry, or may be used with a properly shaped container in place of the container 21 for rendering lard, making apple butter or heating water for any purpose. This heater does not have to be sunk into a pit or placed upon a platform. The various parts are particularly light so that one man can easily handle them and haul the heater to any place on the farm where it is desired to set up the apparatus and cook food. It is obvious that in place of the container 21 having a single compartment, it may be divided into a plurality of compartments, so that different materials may be heated or cooked in the same container.

This device is particularly desirable for dairymen to use in cooking food for their cows and is particularly convenient in butchering where it is necessary to keep water hot for scalding purposes.

I claim:—

A cooker and heater of the character described comprising an outer casing of sheet metal having a bottom and a removable lid, an oven removably disposed within the casing, the side wall of the oven extending down to the bottom of the casing and resting thereon, the bottom of the oven having apertures and being spaced from the bottom of the outer casing, a lamp disposed in the bottom of the casing and having a plurality of burners, chimneys on the burners extending upward through the apertures in the bottom of the oven, and a cooking container open at the top and adapted to rest on the top of the oven and to be disposed within the casing, the container having a diameter less than the diameter of the casing.

In testimony whereof I hereunto affix my signature.

JERRY ROWLETT.